(12) United States Patent
Platzek et al.

(10) Patent No.: US 9,145,076 B2
(45) Date of Patent: Sep. 29, 2015

(54) ARMREST FOR A DOOR OF A MOTOR VEHICLE

(71) Applicant: Dr. Ing. h.c. F. Porsche Aktiengesellschaft, Stuttgart (DE)

(72) Inventors: Holger Platzek, Sontra (DE); Paul-Dieter Fengei, Freigericht (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/168,326

(22) Filed: Jan. 30, 2014

(65) Prior Publication Data

US 2014/0210232 A1    Jul. 31, 2014

(30) Foreign Application Priority Data

Jan. 30, 2013  (DE) .......................... 10 2013 100 903

(51) Int. Cl.
*B60N 2/46* (2006.01)
*B60N 2/42* (2006.01)
*B60N 2/427* (2006.01)

(52) U.S. Cl.
CPC .............. *B60N 2/466* (2013.01); *B60N 2/4235* (2013.01); *B60N 2/42709* (2013.01)

(58) Field of Classification Search
CPC .................................. B60N 2/46; B60N 2/466
USPC ....................................................... 296/153
See application file for complete search history.

(56) References Cited

U.S. PATENT DOCUMENTS

| 3,018,205 | A | * | 1/1962 | Barut ............................. 428/116 |
| 3,279,853 | A | * | 10/1966 | Cromwell et al. ........ 297/411.21 |
| 3,400,979 | A | * | 9/1968 | James ....................... 297/411.21 |
| 3,616,141 | A | * | 10/1971 | Anderson ..................... 428/116 |
| 3,640,798 | A | * | 2/1972 | Deeds .......................... 428/117 |
| 3,978,265 | A | * | 8/1976 | Hillier et al. .................... 428/44 |
| 4,135,018 | A | * | 1/1979 | Bonin et al. .................. 428/116 |
| 4,448,828 | A | * | 5/1984 | Mochida et al. ............. 428/34.4 |
| 5,395,161 | A |   | 3/1995 | Spykerman et al. |
| 5,431,980 | A | * | 7/1995 | McCarthy ..................... 428/116 |
| 5,951,094 | A | * | 9/1999 | Konishi et al. ................ 296/153 |
| 5,997,077 | A |   | 12/1999 | Siebels et al. |
| 6,142,563 | A | * | 11/2000 | Townsend et al. ......... 297/216.1 |
| 7,357,443 | B2 |   | 4/2008 | Wolff et al. |
| 7,828,388 | B2 |   | 11/2010 | Thomas |
| 8,123,280 | B2 | * | 2/2012 | Hori et al. ..................... 296/153 |
| 2009/0256384 | A1 | * | 10/2009 | Hughes et al. ................ 296/153 |

FOREIGN PATENT DOCUMENTS

| DE | 1 655 007 | 7/1971 |
| DE | 4140706 A1 | 6/1993 |
| DE | 19712902 C1 | 3/1998 |
| DE | 19736839 A1 | 2/1999 |
| DE | 10211656 C1 | 7/2003 |
| DE | 102008060432 A1 | 7/2009 |
| DE | 10 2011 101 574 | 4/2012 |
| JP | 2010188803 A | 9/2010 |

* cited by examiner

*Primary Examiner* — Hilary Gutman
(74) *Attorney, Agent, or Firm* — Gerald E. Hespos; Michael J. Porco; Matthew T. Hespos

(57) ABSTRACT

A crash structure is provided as an internal support in an armrest on a door lining of a motor vehicle. The crash structure has cross-shaped recesses. A foam element is above the crash structure and is covered by a decorative layer above the crash structure. The crash structure absorbs loads in the event of a side impact to protect the vehicle occupants against increased force peaks.

12 Claims, 2 Drawing Sheets

ARMREST FOR A DOOR OF A MOTOR VEHICLE

CROSS REFERENCE TO RELATED APPLICATION

This application claims priority under 35 USC 119 to German Patent Appl. No. 10 2013 100 903.4 filed on Jan. 30, 2013, the entire disclosure of which is incorporated herein by reference.

BACKGROUND

1. Field of the Invention

The invention relates to an armrest for a door or a door lining of a motor vehicle, with an internal crash element.

2. Description of the Related Art

DE 1 655 007 discloses a vehicle arm support having a cellular structure with intersecting vertical walls forming openings between one another. The cellular structure is covered externally by a flexible filling material that extends as far as an outer shell of the vehicle arm support.

DE 10 2011 101 574 A1 discloses an armrest for a side door of a motor vehicle. The inside of the armrest has an energy absorption element designed as a folding structure. The energy absorption element can absorb impact energy on the side door in the event of an impact on the vehicle in the transverse direction of the vehicle.

It is an object of the invention to provide an armrest on a side door or on a door lining of a motor vehicle that permits an absorption of load in the event of a side impact on the vehicle to protect vehicle occupants from increased force peaks.

SUMMARY OF THE INVENTION

The invention relates to a crash element integrated in the armrest and having a special crash structure to protect a vehicle occupant against penetration of the armrest into the passenger compartment in the event of a side impact on the vehicle. The crash structure of the armrest comprises crash elements with cross-shaped recesses or openings surrounded by a wall. The crash elements are in the form of a cohesive, single-piece structure having a multiplicity of crash elements.

The crash elements are joined to one another via externally projecting formations on the walls. In particular, the cross-shaped recesses or openings in the crash elements of the crash structure are formed from two elongate openings that intersect at a right angle. Each opening has a rounded portion on the inside. The rounded portions form externally projecting formations in the walls, via which the crash elements are joined together. The crash structure preferably is arranged approximately in the center of the armrest in a horizontal plane between inner and outer armrest supports.

The crash structure within the armrest can absorb energy of a side impact and can be folded up or deformed under the action of force.

The crash structure preferably is integrated in at least one armrest support. Furthermore, the crash structure can be composed of a molded plastics material or a metallic material.

An exemplary embodiment of the invention is illustrated in the drawings and is described in more detail below.

DETAILED DESCRIPTION OF THE PREFERRED EMBODIMENT

Figure 1:
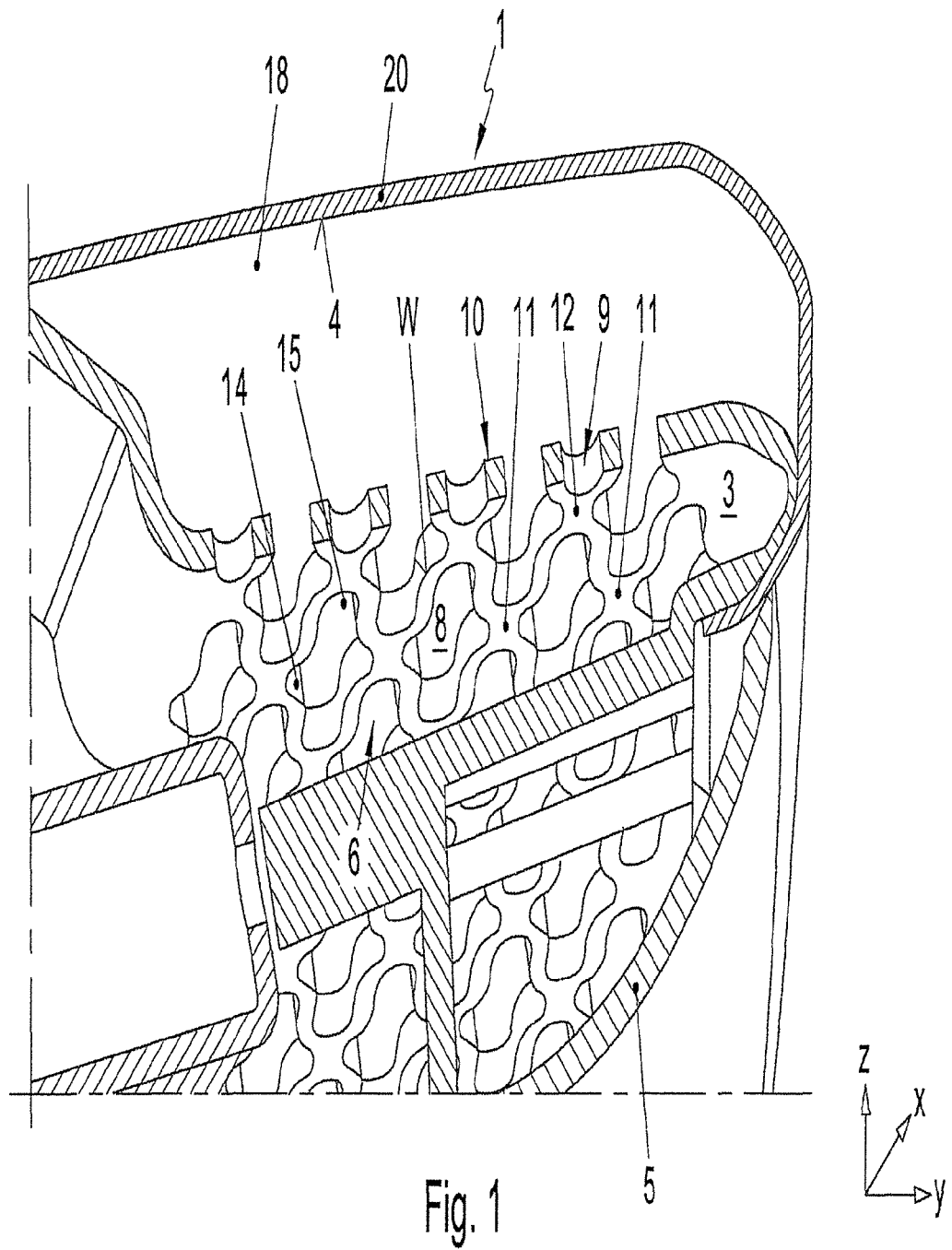
FIG. 1 shows a diagrammatic illustration of the crash structure integrated in the armrest.
Figure 2:
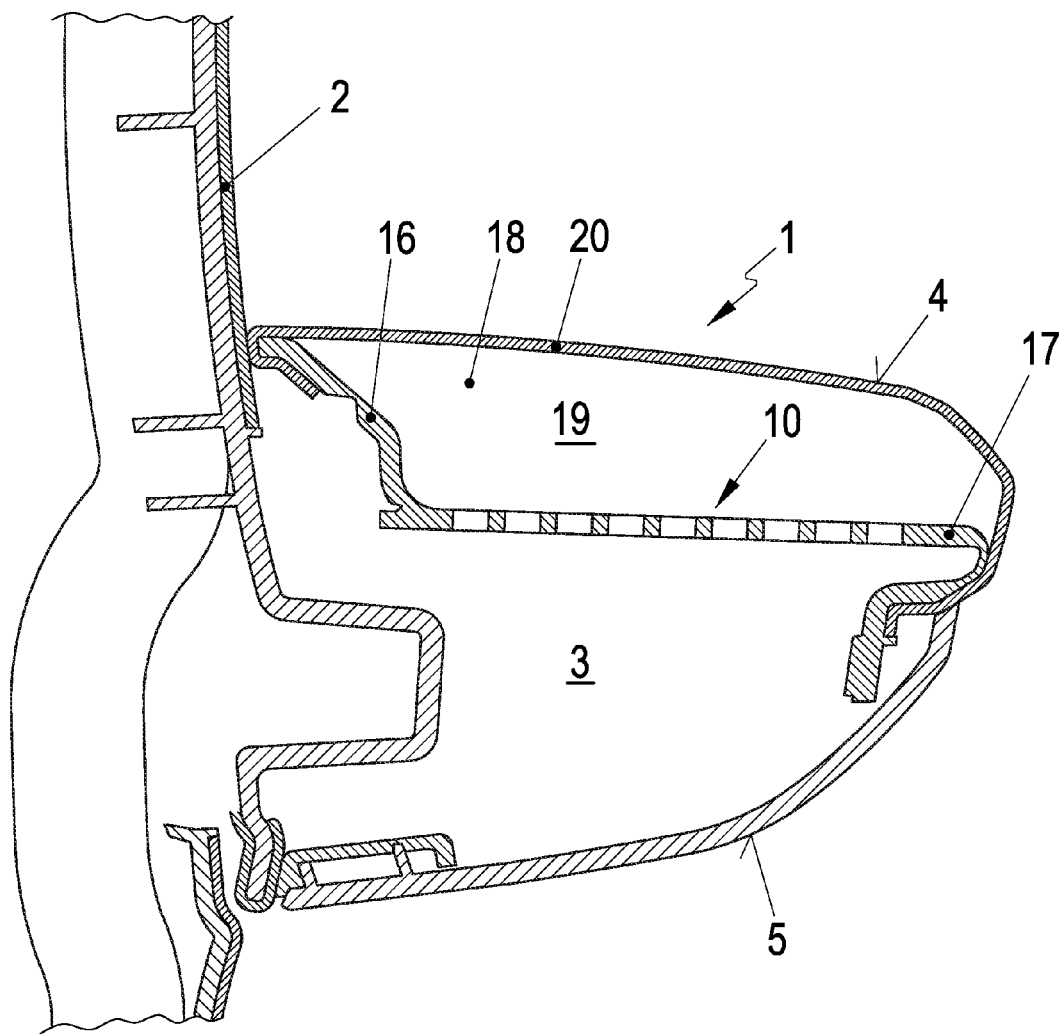
FIG. 2 shows a cross section through the armrest in the vertical plane according to FIG. 1.

An armrest 1 of a motor vehicle is arranged on an inside of a door or on a door lining 2 of a vehicle door and preferably comprises two shells 4 and 5 enclosing a cavity. A crash element is arranged between the shells 4 and 5. The crash element is an internal support having a special crash structure 10 that comprises crash elements 6 with a multiplicity of cross-shaped recesses 8 or openings. The multiplicity of crash elements 6 preferably form a cohesive structure and constitute a single-part unitary crash structure 10. The cohesion of the crash structure 10 is achieved by formations 11, 12 that project on the outside of walls W of the crash elements 9 to join the crash elements 9 unitarily.

Each cross-shaped recess 8 includes two elongate openings 14, 15 that intersect one another at right angles. The intersecting point of the two elongate openings 14, 15 preferably is located in the center of the respective cross-shaped recess 8 or opening. The free ends of each elongate opening 14, 15 are concave rounded surfaces facing into the respective cross-shaped recess 8, while outwardly facing formations at opposite ends of each elongate opening 14, 15 define convex rounded portions that form the externally projecting formations 11, 12 on the walls W, via which the individual crash elements 9 of the crash structure 10 are connected.

The crash structure 10 preferably is arranged approximately in the center of the armrest 1 in a horizontal plane between an inner and an outer armrest support 16, 17. The crash structure 10 can be integrated in at least one armrest support. A filling foam element 18 is arranged within the upper shell 4 of the armrest 1 above the crash structure 10 and fills the entire upper cavity 19 between the crash structure 10 and the upper shell 4. A decorative layer 20 of the upper shell 4 is on the outside of the foam element 8.

The crash structure 10 can be formed from a plastics material or else can be composed of a metallic material.

What is claimed is:

1. An armrest for a side door of a motor vehicle, the armrest comprising:
   an upper shell and a lower shell, and a cavity formed therebetween,
   a crash structure arranged in a horizontal plane between the upper and lower shells;
   a plurality of cross-shaped recesses formed in the crash structure, each of the plurality of cross-shaped recesses comprising first and second elongated openings arranged perpendicular to each other and intersecting at a substantially central position in the recess, each of the first and second elongated openings having opposite first and second rounded surfaces facing each other to define first and second spaced apart concave openings; and
   a plurality of crash elements formed between the concave openings of adjacent recesses.

2. The armrest of claim 1, further comprising a foam element arranged in the upper shell above the crash structure.

3. The armrest of claim 1, wherein the crash structure is integrated in at least one armrest support.

4. The armrest of claim 1, wherein each of the elongate openings in each of the cross-shaped recesses aligns with at least one of the elongate openings of the cross-shaped recess in at least one of the crash elements adjacent thereto.

5. The armrest of claim 1, wherein one of the elongate openings in each of the cross-shaped recesses aligns with a lateral direction of the motor vehicle.

6. The armrest of claim 1, wherein the crash structure is composed of a molded plastics material or a metallic material.

7. The armrest of claim 1, further comprising a decorative layer on an the upper shell of the armrest.

8. An armrest for a side door of a motor vehicle, the armrest comprising:
   an upper shell and a lower shell, and a cavity formed therebetween;
   a unitary planar crash structure arranged between the upper and lower shells, the crash structure having a unitary wall with a plurality of crash elements formed therein; and
   a plurality of cross-shaped recesses formed in the unitary wall, each of the cross-shaped recess having four rounded concave surfaces separated from one another by approximately 90° and four rounded convex surfaces disposed respectively between the concave surfaces.

9. The armrest of claim 8, wherein the cross-shaped recesses are arranged so that one of the rounded concave surfaces in each cross-shaped recess is opposite one of the rounded concave surfaces in an adjacent one of the cross-shaped recesses.

10. The armrest of claim 9, wherein two of the rounded concave surfaces in each cross-shaped recess are aligned along a lateral direction of the vehicle.

11. The armrest of claim 8, wherein the crash structure is substantially horizontal.

12. The armrest of clam 8, wherein the plurality of cross-shaped recesses are arranged in a plurality of rows, and the plurality of cross-shaped recess of each of the plurality of rows are offset from the plurality of cross-shaped recesses of adjacent rows.

* * * * *